Feb. 9, 1943.   P. B. PARKS ET AL   2,310,745
SOLENOID INLET VALVE
Filed May 17, 1940   3 Sheets-Sheet 1
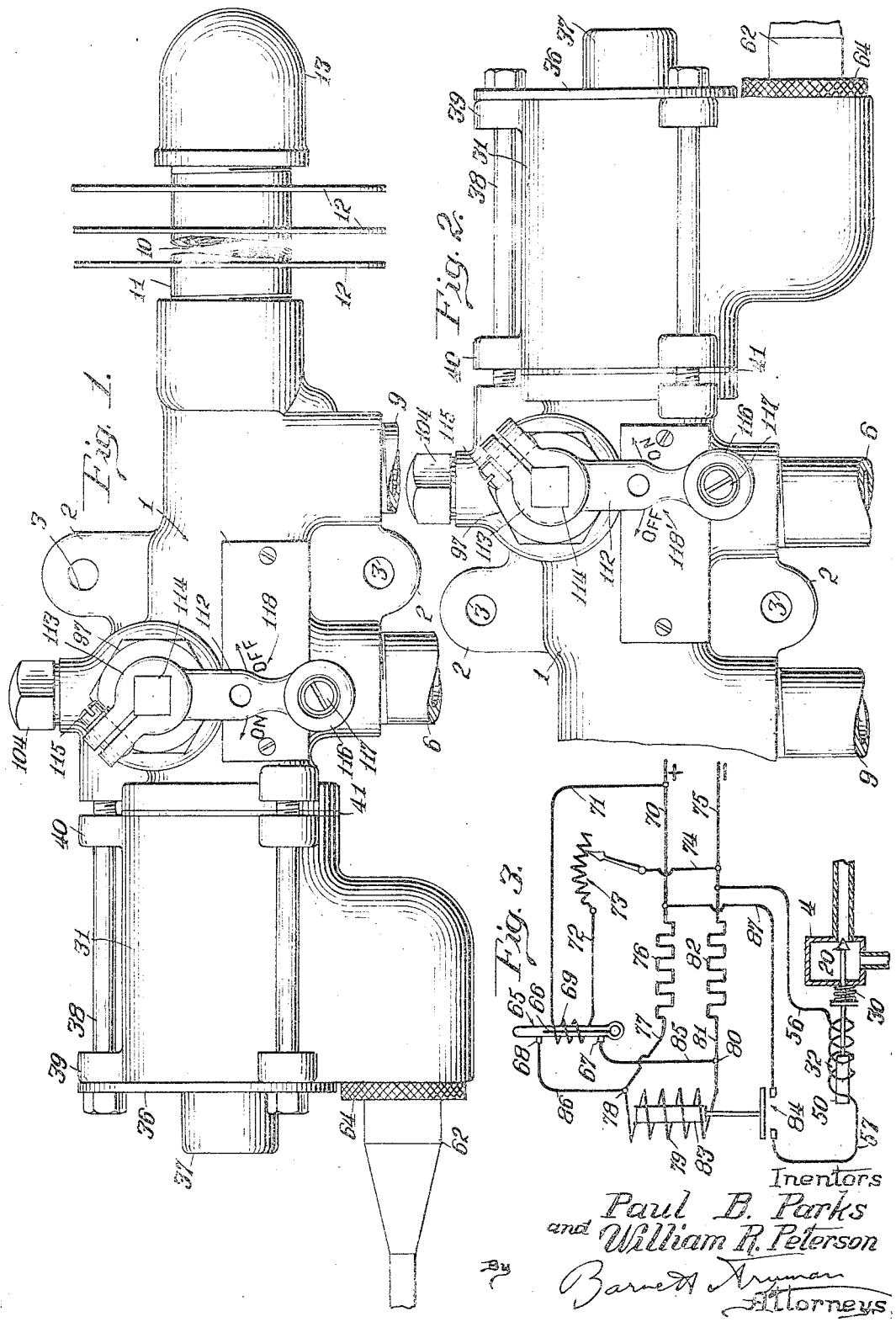
Inventors
Paul B. Parks
and William R. Peterson
By Barrett Knyman
Attorneys Feb. 9, 1943.  P. B. PARKS ET AL  2,310,745
SOLENOID INLET VALVE
Filed May 17, 1940  3 Sheets-Sheet 2
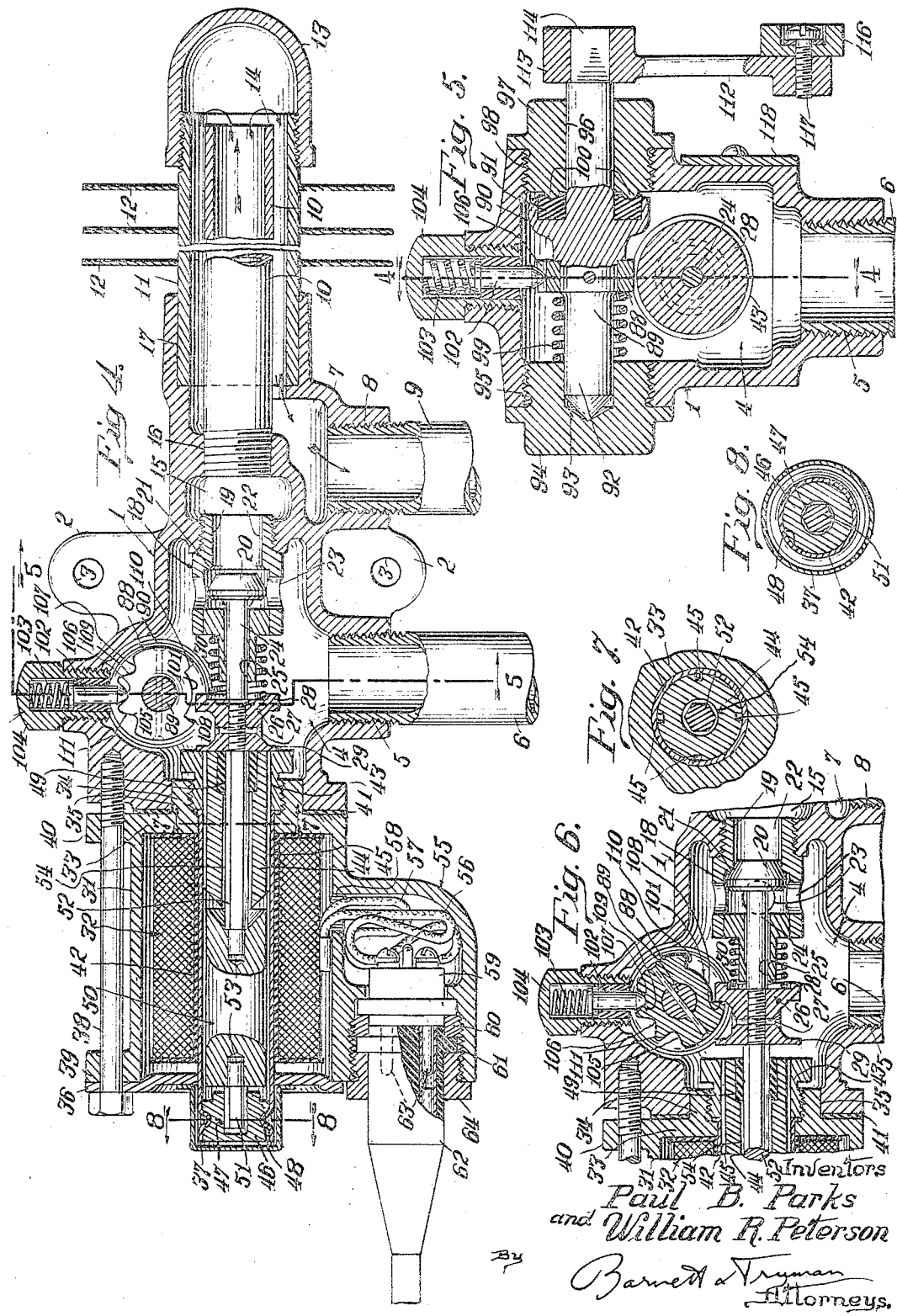
Inventors
Paul B. Parks
and William R. Peterson
By Barnett & Tryman
Attorneys.

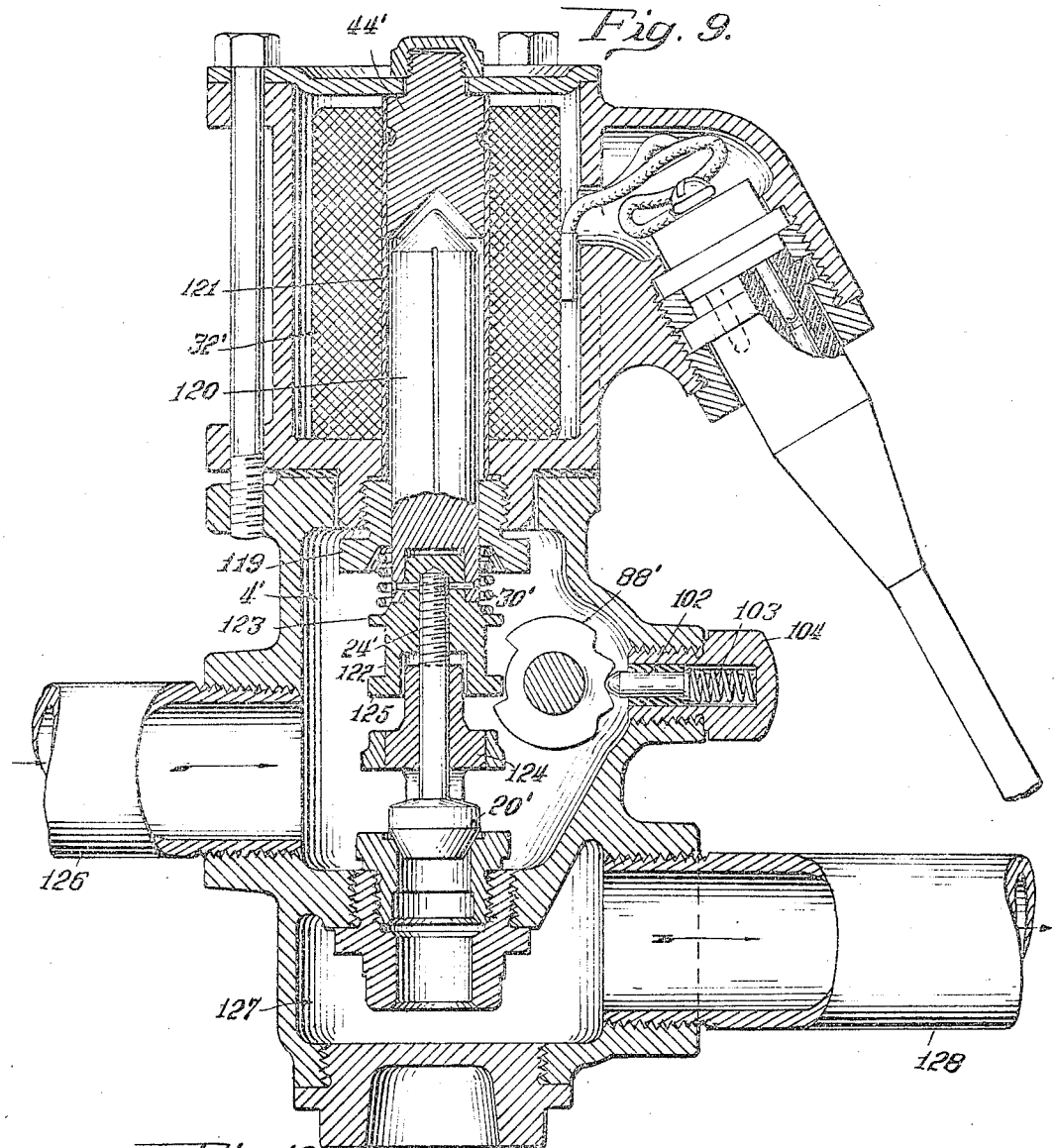
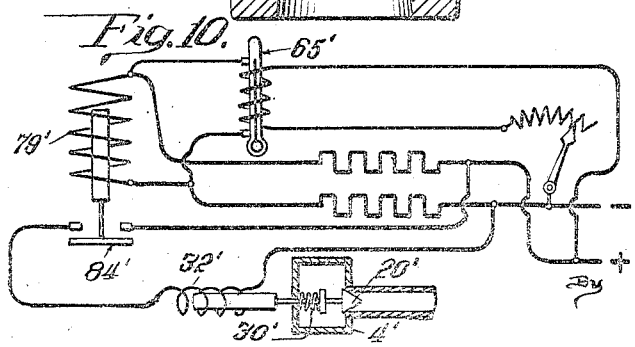

Patented Feb. 9, 1943

2,310,745

UNITED STATES PATENT OFFICE 2,310,745

SOLENOID INLET VALVE

Paul B. Parks, Oak Park, and William R. Peterson, Chicago, Ill., assignors to Vapor Car Heating Company, Inc., Chicago, Ill., a corporation of New York Application May 17, 1940, Serial No. 335,719

13 Claims. (Cl. 137—139)

This invention relates to certain new and useful improvements in a solenoid inlet valve, more particularly an improved valve for controlling the flow of steam into a radiator, said valve being adapted for operation either thermostatically by suitable electrically actuated mechanism, or manually with means for locking the valve yieldably in either open or closed positions.

While this valve is adapted to control the flow of steam into substantially any type of radiating device, it is especially designed for use with a radiator of the "inner-feed" type comprising a pair of concentric or coaxial pipes, the inlet and the outlet of the radiator being at the same end of the radiator, and both the inlet and outlet pipes being connected through the improved valve.

Briefly described, the improved valve comprises a movable valve member, a spring for normally urging the valve member in one direction, usually toward open position, and a solenoid-motor for moving the valve in the opposite direction, usually to close the valve against the opposition of the spring. This movable assembly of the valve has a lost-motion connection with a manually operable device which, when in an intermediate position, permits free movement of the valve toward and from closed position by means of the solenoid and spring. This manually operable mechanism may be moved in alternate directions so as to either move the valve to closed position and hold it in this position, or to hold the valve in open position. A yieldable locking mechanism cooperates with the manually operable mechanism to either hold the valve in open or closed position, or hold the manually operable mechanism in the intermediate position, permitting free control by the electrically actuated mechanism.

The principal object of this invention is to provide an improved radiator inlet valve of the type briefly described hereinabove and disclosed more in detail in the specifications which follow.

Another object is to provide an improved solenoid-operated mechanism for moving the valve.

Another object is to provide an improved mechanism for manually operating the valve and locking it in either open or closed positions.

Another object is to provide an improved valve especially adapted for use with a radiator of the "inner-feed" type.

Another object is to provide improved means for draining the solenoid and protecting the solenoid from moisture when the valve is open.

Another object is to provide improved bearing means for supporting and guiding the core of the solenoid.

Other objects and advantages of this invention will be more apparent from the following detailed description of certain approved forms of valve constructed and operating according to the principles of this invention.

In the accompanying drawings:

Fig. 1 is a side elevation of the valve and connected radiator, a portion of the radiator being broken away.

Fig. 2 is a similar elevation of the other side of the valve, partly broken away.

Fig. 3 is a wiring diagram showing the thermostatic and electrically actuated mechanism adapted for cooperation with the form of valve shown in Figs. 1 to 8 inclusive.

Fig. 4 is a longitudinal vertical section through the valve and radiator, on the same scale as Figs. 1 and 2, the view being taken substantially on the line 4—4 of Fig. 5.

Fig. 5 is a transverse vertical section taken substantially on the line 5—5 of Fig. 4.

Fig. 6 is a partial vertical section, corresponding to the central portion of Fig. 4, but showing the valve in closed position after being moved to and held in this position by the manually operated means.

Fig. 7 is a transverse vertical section taken substantially on the line 7—7 of Fig. 4.

Fig. 8 is a transverse vertical section taken substantially on the line 8—8 of Fig. 4.

Fig. 9 is a vertical section, similar to Fig. 4, of a modified form of valve assembly.

Fig. 10 is a wiring diagram, similar to Fig. 3, but adapted for operating the form of valve shown in Fig. 9.

Referring first to the form of valve shown in Figs. 1 to 8 inclusive, the improved valve comprises a main casting 1 formed with upper and lower bracket flanges 2, each perforated at 3 to receive a bolt or other means for supporting the valve assembly. The casting 1 is formed with an interior steam chamber 4 into which leads a threaded inlet port 5 for receiving the end of the steam supply pipe 6. The casting 1 is also formed with a return chamber 7 from which leads an outlet port 8 threaded to receive the end of the return or drain pipe 9.

The radiator shown in Figs. 1 and 4 is of the so-called "inner-feed" type comprising a pair of concentric or coaxial pipes 10 and 11, the outer pipe 11 being provided with a plurality of fins 12 for increasing the radiating surface, and being closed at its outer end, that is the end remote from the valve, by a closure cap 13. The inner pipe 10 which receives the steam from the valve, in the manner hereinafter described, terminates at its outer end 14 short of the cap 13 so that the steam from inner pipe 10 will be diverted by cap 13 and flow back through the annular space between pipes 10 and 11, all as indicated by the arrows in Fig. 4. A steam passage 15 extends from steam chamber 4 into return chamber 7, the outer end of this passage being threaded at 16 to receive the inner end of the inner radiator pipe 10. A seat or port 17 is also formed in the adjacent outer end of casting 1 to receive the open end of outer radiator pipe 11 so that the fluids returned through the radiator pipe 11 and outside of pipe 10 will be discharged into the return chamber 7 and thence will drain out through pipe 9.

A cage structure 18 has a hollow nipple 19 threaded into the inlet end of passage 15 and the movable valve member 20 guided in cage 18 is adapted to engage the valve seat 21 formed at the inlet end of passage 22 through nipple 19 and cut off the flow of steam to the radiator. When the valve 20 is moved back away from seat 21, steam will flow from steam chamber 4 through passages 23 in the cage, thence through steam passages 22 and 15 and into the other pipe 10 of the radiator. The valve stem 24 extends rearwardly from valve member 20 and is slidably guided at 25 in the rear head portion of the cage 23. A collar member, indicated generally at 26, is suitably secured, as by pin or rivet 27, on the rear end portion of valve stem 24. This collar member comprises a flange or disc 28 at its inner end which forms a portion of the manually-operated valve moving and locking mechanism hereinafter described. The other end of collar 26 is in the form of an enlarged head 29 having a flat rear face adapted to engage and seal certain passages in the solenoid-assembly as later described. A compression spring 30 surrounds the valve stem 24 and is confined between collar 26 and a portion of cage 18 and functions to move valve 20 to the open position shown in Fig. 4. At the same time it moves the sealing member 29 to operative engagement with the solenoid assembly.

This solenoid assembly comprises a casing 31 enclosing the solenoid winding 32 and partially closed at one end by the inwardly extending flange 33 from which extends forwardly the sleeve or nipple 34 which fits within opening 35 formed in the rear end of main casting 1. In this way the solenoid assembly closes that end of the main steam chamber 4 opposite the outlet valve passage 19. The other end of the solenoid assembly is closed by a main cover member 36 and a cap 37. A series of screw-bolts 38 extend through cover plate 36 and flanges or lugs 39 and 40 on the casing 31 and engage at their inner ends in threaded openings in main casting 1 so as to clamp the solenoid assembly against the gasket 41. The guide tube 42 extending centrally through the solenoid assembly, coaxial with valve stem 24, fits within the solenoid casing and is held in place by the retaining nut 43 screwed into the sleeve 34 of the housing 31. The plug member 44 is fitted snugly within the inner end portion of guide tube 42 and the retaining nut 43. A series of longitudinally extending drainage slots 45 are formed in the outer surface of plug 44 (see Fig. 7). A bearing member 46 formed with a central cylindrical bearing surface 47 is mounted within the outer end portion of guide tube 42 and held in place by the inwardly crimped portion 48 of the tube. A similar bearing member 49 is fitted within the end of plug 43 adjacent the steam chamber 4. The core 50 of the solenoid is movable with ample clearance within guide tube 42 and is supported by the bearing rods 51 and 53 respectively secured at their inner ends 53 within the ends of core 50. These rods 51 and 52 have hexagonal or other non-circular end portions which fit slidably within the cylindrical bearings 46 and 49 so as to have multiple-edge contact with the bearing surfaces therein. (See Fig. 8.) The bearing rod 52 extends freely through a central passage 54 formed in plug 44. The bearing rods 51 and 52 are coaxially aligned with the valve stem 24, and when the solenoid coil 32 is energized the core 50 will be drawn in toward the inner end of plug 44 so that rod 52 will engage the end of the valve stem and move the valve assembly to the right (Fig. 4) against the resistance of spring 30 until the valve 20 is closed against the seat 21, thus cutting off the flow of steam to the radiator. When the solenoid is de-energized, the spring 30 will expand thus moving the valve-assembly toward the left and opening the valve. At the same time the head 29 of collar 26 will be clamped against the head of retaining nut 43 so as to effectively close the drain slots 45 in plug 44, and also close the central bearing passage in which rod 42 is mounted. It will now be seen that when the valve is in the closed position, as shown in Fig. 6, the drain slots 45 will be open so as to permit condensed steam to drain out of the solenoid assembly (that is from the space within guide tube 42). At such times as the valve is open (as shown in Fig. 4) the collar 26 will be moved to close the passages leading into the guide tube 42 and thus prevent, as far as possible, the entrance of foreign particles in the steam flowing into the solenoid chamber and to the bearing surfaces.

An integral casing extension 55 projects from one side (preferably the bottom) of the solenoid housing 31. The circuit wires 56 and 57 (see also Fig. 3) extend from the ends of solenoid winding 32 through opening 58 into housing extension 55 and connect with terminals at the inner end of connector plug 59 held in place by locking ring 60 screwed into the threaded passage 61 in housing extension 55. The outer removable connector plug 62 is adapted to be pushed into connection with the terminal plugs 63 extending forwardly from plug 59, plug 62 being held in place by the jam nut 64 also screwed into the outer end of threaded passage 61. By simply screwing out the jam nut 64 and then pulling out plug 62 the wiring connections can be removed without disturbing the permanent solenoid assembly comprising the inner plug 59.

A typical circuit for thermostatically actuating and controlling this valve is diagrammatically shown in Fig. 3. The thermostat indicated generally at 65 is positioned at some suitable location in the compartment or space heated by the radiator, this thermostat comprising a mercury column 66 which is always in engagement with a lower fixed contact 67 and which engages an upper fixed contact 68 at some predetermined temperature. An auxiliary heating coil 69 is associated with the thermostat, this coil being energized over the following circuit: From power main 70 through wire 71, coil 69, wire 72, rheostat 73 and wire 74 to the other power main 75. The strength of the current in heating coil 69, and hence the amount of heat added to the thermostat, will depend upon the manual adjustment of rheostat 73 which will be suitably calibrated so that a plurality of desired temperatures may be selected within the compartment. While the thermostat 65 is directly responsive to temperature changes within the compartment, the actual compartment temperature at which the mercury column will engage the upper fixed contact 68 is dependent upon the amount of auxiliary heat added to the thermostat by coil 69. For example, if the thermostat is so designed that (without the heat from coil 69) the thermostat will function at a temperature of 75° Fahrenheit, then if 5° of heat are added to the thermostat by the energization of heating coil 69, the thermostat will actually function at a compartment temperature of 70°.

The relay coil 79 is normally energized over the following circuit: From main 70 through resistance 76, wire 77, relay terminal 78, relay coil 79, terminal 80, wire 81, resistance 82, back to the other power main 75. When the relay is so energized it will lift the core 83 of the relay so as to open the switch indicated at 84. This will be the position of the parts when the heat-requirements of the space have not been satisfied, and since solenoid 32 is not energized at this time, the spring 30 will move valve 20 to the open position shown in Fig. 3 so that the radiator will be receiving steam. When the desired temperature is reached in the compartment being heated, the mercury column will engage the upper thermostat contact 68 and thus complete a shunt circuit around the relay as follows: From one terminal 80 of the relay through wire 85, mercury column 66 and wire 86 to the other terminal 78 of the relay. This will deenergize the relay so that switch 84 will automatically close, thus completing a circuit energizing solenoid 32 as follows: From main 70 through wire 87, switch 84, wire 57, solenoid coil 32, and wire 56 to the other power main 75. The solenoid 32 will now be energized to draw in the core 50 and force the valve 20 to closed position against the resistance of spring 30. This will cut off the further flow of steam to the radiator. Obviously, as soon as the temperature has again fallen so as to break the contact between mercury column 66 and thermostat contact 68, the relay 79 will again be effective to open switch 84 and deenergize the solenoid 32, whereupon spring 30 will again open the valve.

The valve can also be manually operated. Returning to Figs. 1, 2, 4, 5 and 6, a disc member 88 is formed on or fixedly secured to a shaft 89 extending horizontally through the upper portion of steam chamber 4. A cup-member 90 extending laterally at one side of disc 88 houses a sealing ring 91. One end 92 of shaft 89 is journaled in a socket 93 formed in the closure plug 94 threaded at 95 into an opening formed in one side of casting 1. The other end of shaft 89 extends through and is journaled in a bearing 96 formed in a similar closure plug 97 threaded into an opening 98 in the opposite side of casting 1. A spring 99 confined between plug 94 and one side of disc 88 urges this whole rotatable assembly toward the other plug 97, which is formed with an annular projection 100 adapted to engage the sealing ring 91, thus preventing the escape of fluid through the opening 96 in which shaft 89 is journaled.

An arcuate recess 101 (Fig. 4) is formed within one peripheral portion of disc 88, this recess receiving the projection or flange 28 formed on collar 26 as previously described. When disc 88 is in the intermediate or central position indicated in Fig. 4, the core 54, projection 28 and valve stem 24 can be reciprocated longitudinally so as to open or close the valve under control of the solenoid 32 and spring 30, as already described. The arcuate slot 101 is of sufficient width to permit this movement of projection 28.

The locking detent 102, urged downwardly by spring 103, is slidably guided within the screw plug 104 mounted in the upper wall of casing 1 so that the rounded lower end of detent 102 will engage alternatively in one or another of the locking recesses 105, 106 and 107 formed in the peripheral portion of disc 88 substantially opposite the arcuate recess 101. When this manually operable assembly is in the intermediate position shown in Figs. 4 and 5, the detent 102 will be engaged with the central locking recess 106. When the parts are in this position, the manually operable means is not effective, and the valve is entirely under the control of the solenoid and spring. When the disc 88 is rotated through a suitable arc in a counter-clockwise direction (Figs. 4 and 6) the shoulder 108 at one end of recess 101 will engage the projection 28 and shift the movable assembly consisting of stem 24 and valve 20 toward the right, thus moving the valve to closed position against the resistance of spring 30 and yieldably locking the valve in this position when detent 102 has engaged with the sloping inner wall 109 of recess 107 (see Fig. 6). On the other hand, if the disc 88 is swung through a similar arc in the clockwise direction, shoulder 110 at the other end of recess 101 will be moved into proximity to projection 28, thus locking the valve in the open position to which it has been moved by spring 30, and when detent 102 has snapped over into the locking recess 105 and is engaging the sloping inner wall 111 of this recess, the valve will be held in open position by this locking means and sealing collar 29 will be held against the ends of the passages in nut 43.

As indicated in Figs. 1, 2 and 5, a suitable crank or lever 112 has a split collar 113 at its upper end mounted on the non-circular end portion 114 of shaft 89 and held in place by the screw 115. A knob 116 is held in place at the free end of crank 112 by the screw bolt 117. As this crank 112 is swung in one direction or the other across the dial 118 formed on or mounted on the side of valve casing 1, this manually operable assembly may be moved to either extreme position in which the valve is moved to and held in either open or closed position, or the manually operable assembly can be moved to the central or intermediate position in which the valve is controlled automatically by the electrical means. The different positions of the manually operable assembly are indicated on the dial 118, as shown in Fig. 1. It will also be noted from Fig. 2 that this dial 118 is duplicated at 118' on the opposite side of the valve casing, and it will be obvious from the disclosure in Fig. 5 that the two plugs 94 and 97 can be removed and their positions reversed and the entire manually operable assembly shifted end for end so as to place the operating handle 112 on either side of the valve casing as may be most convenient in any particular installation. If it is desirable to operate this valve from a remote location, a suitable link or other equivalent portion of the means for operating crank 1 from a distance can be connected to the outer end of the crank in lieu of the knob 116.

It might also be stated that the bearing rods 51 and 52 of the solenoid assembly are preferably made of stainless steel, and all exposed iron parts in this assembly are suitably treated or plated to resist corrosion.

In Fig. 9 is shown a modified form of valve, the essential point of difference from the valve already described being that the valve 20' in Fig. 9 is closed by the spring 30' and opened by the solenoid assembly, indicated generally at 32'. Many of the operating parts of this valve assembly are essentially the same as those already described in connection with the first form of valve and need not be again referred to in detail. The upper end of the solenoid passage is closed by the plug 44', and the lower end is partially closed by the annular nut 119 having a central passage through which slides the core of the solenoid 120 which projects upwardly into guide tube 121. The upper threaded end portion 24' of the valve stem is threaded into the head 122 at the lower end of core 120, this valve stem carrying the valve 20' at its lower end. The spring 30' is confined between the fixed nut 119 and a flange 123 at the upper end of head 122. The valve stem 24' is guided for vertical sliding movement through the cage structure 124. The annular flange or projection 125 at the lower end of head 122 cooperates with the disc 88' of the manually operable mechanism which otherwise may be of the same form heretofore described.

The wiring diagram shown in Fig. 10 and cooperating with the modified form of valve shown in Fig. 9, is essentially the same as the diagram shown in Fig. 3, with only such changes as are necessary to enable the solenoid to open the valve instead of closing the valve.

In Fig. 10 the relay 79', when energized, will close the switch 84' instead of opening the switch, as in Fig. 3. In the position indicated in Fig. 10, the desired temperature has been reached in the space in which thermostat 65' is located so that relay 79' has been de-energized and switch 84' has opened. Under these conditions the spring 30' is effective to close the valve 20'. However, when the temperature in the space falls, the relay 79' will be energized and will close switch 84' so that the solenoid 32' will be energized to open switch 20' against the resistance of spring 30'.

It will be noted that in the form of valve shown in Fig. 9 the steam enters valve-chamber 4' through supply pipe 126 and, when the valve 20' is open, steam flows from chamber 127 through pipe 128 to the radiator. This radiator may be of any ordinary construction from which the fluids do not return to the valve, as in the form of valve first described herein. It may here be stated that this first described form of valve (see Fig. 4) can also be used with this ordinary type of radiator. In such a combination, the pipes 9 and 11 are omitted, and a pipe similar to pipe 10 is connected in port 16 and conducts steam from the valve to the radiator.

We claim

1. A radiator inlet-valve for use in a steam heating system comprising a casing enclosing a steam chamber, a port for receiving steam and leading it into the chamber, an outlet port for delivering steam from the chamber, a movable assembly within the chamber comprising a valve member adapted to close the outlet port, a spring for normally moving the assembly in a direction to open the valve, electrically actuated means for moving the assembly in the opposite direction, in opposition to the spring, to close the valve, a projection extending laterally from a portion of the moveable assembly, a manually operable member movable adjacent the movable assembly and formed with a recess receiving the projection and permitting free movement of the valve by the electrically actuated means from open to closed position, said manually operable member being movable to engage said projection and shift the movable assembly to close the valve, and movable in the opposite direction to prevent closing movement of the valve, and means for yieldably locking the manually operable member in positions to hold the valve either open or closed or to permit movement of the valve by the electrically actuated means.

2. A radiator inlet-valve for use in a steam heating system comprising a casing enclosing a steam chamber, a port for receiving steam and leading it into the chamber, an outlet port for delivering steam from the chamber, a movable assembly within the chamber comprising a valve member adapted to close the outlet port, a spring for normally moving the assembly in a direction to open the valve, electrically actuated means for moving the assembly in the opposite direction, in opposition to the spring, to close the valve, a projection extending laterally from a portion of the movable assembly, a manually operable member comprising a disc pivoted adjacent the movable assembly and formed with an arcuate recess receiving the projection and permitting the valve, in one position of the disc, to be moved from open to closed position by the electrically actuated means, a lever for swinging the disc to one extreme position to move the valve to and hold the valve in closed position, or to another extreme position in which the valve is held in open position, and locking means for holding the disc in either extreme position or in the first mentioned intermediate position in which the valve is movable by the electrically actuated means.

3. A radiator inlet-valve for use in a steam heating system comprising a casing enclosing a steam chamber, a port for receiving steam and leading it into the chamber, an outlet port for delivering steam from the chamber, a movable assembly within the chamber comprising a valve member adapted to close the outlet port, a spring for normally moving the assembly in a direction to open the valve, electrically actuated means for moving the assembly in the opposite direction, in opposition to the spring, to close the valve, a projection extending laterally from a portion of the movable assembly, a manually operable member comprising a disc pivoted adjacent the movable assembly and formed with an arcuate recess receiving the projection and permitting the valve, in one position of the disc, to be moved from open to closed position by the electrically actuated means, a lever for swinging the disc to one extreme position to move the valve to and hold the valve in closed position, or to another extreme position in which the valve is held in open position, and locking means for holding the disc in either extreme position or in the first mentioned intermediate position in which the valve is movable by the electrically actuated means, said locking means comprising a spring-pressed detent adapted to alternatively engage three spaced apart recesses in the peripheral portion of the disc, one of the outermost recesses having an inner cam surface, the spring-pressed detent engaging said cam surface to force the valve to closed position.

4. A radiator inlet-valve for use in a steam heating system comprising a casing enclosing a steam chamber, a port for receiving steam and leading it into the steam chamber, an outlet port for delivering steam from the chamber, a cage formed with a valve-seat at the inlet of a hollow neck portion fitted into the outlet port, a movable assembly comprising a valve member cooperating with the valve seat and a stem extending rearwardly from the valve, the valve member and stem being guided in the cage for longitudinal movement toward or from the valve seat, a spring surrounding the stem and confined between a portion of the movable assembly and a portion of the cage and urging the valve member away from the valve seat, a core positioned to move the rear end portion of the stem, and a solenoid coil in which the core is slidable and adapted to attract the core and move the valve to closed position, a projection extending laterally from a portion of the movable assembly, a manually operable member movable adjacent the movable assembly and formed with a recess receiving the projection and permitting free movement of the valve by the solenoid from closed to open position, said manually operable member being movable to engage said projection and shift the movable assembly to open the valve.

5. A radiator inlet-valve for use in a steam heating system comprising a casing enclosing a steam chamber, a port for receiving steam and leading it into the steam chamber, an outlet port for delivering steam from the chamber, a cage formed with a valve-seat at the inlet of a hollow neck portion fitted into the outlet port, a movable assembly comprising a valve member cooperating with the valve seat and a stem extending rearwardly from the valve, the valve member and stem being guided in the cage for longitudinal movement toward or from the valve seat, a spring confined between a portion of the movable assembly and a portion of the cage and urging the valve member away from the valve seat, a core secured to the rear end portion of the stem, and a solenoid coil in which the core is slidable and adapted to attract the core and move the valve to closed position, a projection extending laterally from a portion of the movable assembly, a manually operable member comprising a disc pivoted adjacent the movable assembly and formed with an arcuate recess receiving the projection and permitting the valve, in one position of the disc, to be moved from open to closed positions by the solenoid, a lever for swinging the disc to one extreme position to move the valve to and hold the valve in closed position, or to another extreme position in which the valve is held in open position, and locking means for holding the valve in either extreme position or in the first mentioned intermediate position in which the valve is movable by the solenoid.

6. A radiator inlet-valve for use in a steam heating system comprising a casing enclosing a steam chamber, a port for receiving steam and leading it into the chamber, an outlet port for delivering steam from the chamber, a valve member movable within the chamber, means comprising a solenoid and an opposing spring for moving the valve to either closed or open positions, and a manually operable assembly partially positioned within the steam chamber and movable from an intermediate position in which the valve is movable by the solenoid or spring, to either of two extreme positions, in one of which the valve is held in open position, and in the other of which the valve is held in closed position, said manually operable assembly comprising a lever positioned outside the casing for moving the manually operable assembly from one to another of its positions.

7. A radiator inlet-valve for use in a steam heating system comprising a casing enclosing a steam chamber, a port for receiving and leading it into the chamber, an outlet port for delivering steam from the chamber, a valve member movable within the chamber, means comprising a solenoid and an opposing spring for moving the valve to either closed or open positions, and a manually operable assembly partially positioned within the steam chamber and movable from an intermediate position in which the valve is movable by the solenoid or spring, to either of two extreme positions, in one of which the valve is held in open position, and in the other of which the valve is held in closed position, said manually operable assembly comprising a lever positioned outside the casing for moving the manually operable assembly from one to another of its positions, the casing being formed on each side thereof with a dial over one of which dials the lever is movable to indicate the selected adjustment of the mechanism, the manually operable assembly being reversible end for end to position the lever over the dial at the most convenient side of the valve.

8. A radiator inlet-valve for use in a steam heating system comprising a casing enclosing a steam chamber, a port for receiving steam and leading it into the chamber, an outlet port for delivering steam from the chamber, a valve member movable within the chamber, means comprising a solenoid and an opposing spring for moving the valve to either closed or open positions, and a manually operable assembly partially positioned within the steam chamber and movable from an intermediate position in which the valve is movable by the solenoid or spring, to either of two extreme positions, in one of which the valve is held in open position, and in the other of which the valve is held in closed position, said manually operable assembly comprising a pair of bearing plugs interchangeably mounted in opposite side walls of the casing, a transverse shaft journaled in said plugs, and a lever positioned outside of the casing and secured on one projecting end of the shaft for moving the manually operable assembly from one to another of its positions, the casing being formed on each side thereof with a dial over one of which dials the lever is movable to indicate the selected adjustment of the mechanism, the manually operable assembly being reversible end for end to position the lever over the dial at the most convenient side of the valve.

9. A radiator inlet-valve for use in a steam heating system comprising a casing enclosing a steam chamber, a port for receiving steam and delivering it into the steam chamber, an outlet port for delivering steam from the chamber, a valve-seat at the inner end of the outlet port, a movable assembly within the chamber comprising a valve-stem, a valve member at one end of the stem adapted to engage the valve-seat and close the outlet port, a solenoid assembly closing the side of the chamber opposite the outlet port, the solenoid comprising a winding surrounding a central passage, a hollow plug fitted within and closing the inner end portion of the passage, a closure member at the outer end of the passage, a core movable in the passage between the closure and plug, hollow bearings in the closure and plug respectively, and rods coaxially aligned with said valve-stem and projecting from opposite ends of said core and slidable in said bearings, one of said rods engaging the stem and moving the valve to closed position when the solenoid is energized.

10. A radiator inlet-valve for use in a steam heating system comprising a casing enclosing a steam chamber, a port for receiving steam and delivering it into the steam chamber, an outlet port for delivering steam from the chamber, a valve-seat at the inner end of the outlet port, a movable assembly within the chamber comprising a valve stem, a valve member at one end of the stem adapted to engage the valve-seat and close the outlet port, a solenoid assembly closing the side of the chamber opposite the outlet port, the solenoid comprising a winding surrounding a central passage, a hollow plug fitted within and closing the inner end portion of the passage, a closure member at the outer end of the passage, a core movable in the passage between the closure and plug, hollow cylindrical bearings formed in said closure and plug respectively, and non-circular rods coaxially aligned with said valve-stem and projecting from opposite ends of said core and having multiple-edge sliding contact within said bearings, one of said rods engaging said stem and moving the valve to closed position when the solenoid is energized.

11. A radiator inlet-valve for use in a steam heating system comprising a casing enclosing a steam chamber, a port for receiving steam and delivering it into the steam chamber, an outlet port for delivering steam from the chamber, a cage having a valve seat therein at the inner end of the outlet port, a movable assembly comprising a valve-stem slidable in the cage, a valve member at the inner end of the stem adapted to engage the valve-seat and close the outlet port, a collar member on the outer end portion of the stem, a spring confined between the cage and collar and adapted to move the valve away from the seat, a solenoid assembly closing the side of the steam chamber opposite the outlet port, the solenoid comprising a winding surrounding a central passage, a hollow plug closing the inner end portion of the passage, a closure for the outer end of the passage, a core movable in the passage, a rod projecting from the core through the plug in alignment with the valve-stem and adapted when the solenoid is energized to engage and move the valve-stem and valve against the spring so as to close the valve, said spring, when the solenoid is de-energized, forcing the stem in the opposite direction to open the valve and to force the collar against the end of the plug to close the passage therethrough.

12. A radiator inlet-valve for use in a steam heating system comprising a casing enclosing a steam chamber, a port for receiving steam and delivering it into the steam chamber, an outlet port for delivering steam from the chamber, a cage having a valve seat therein at the inner end of the outlet port, a movable assembly comprising a valve-stem slidable in the cage, a valve member at the inner end of the stem adapted to engage the valve-seat and close the outlet port, a collar member on the outer end portion of the stem, a spring confined between the cage and collar and adapted to move the valve away from the seat, a solenoid assembly closing the side of the steam chamber opposite the outlet port, the solenoid comprising a winding surrounding a central passage, a hollow plug closing the inner end portion of the passage, a plurality of drain slots extending longitudinally of the outer portion of said plug, a closure for the outer end of the passage, a core movable in the passage, a rod projecting from the core through the plug in alignment with the valve-stem and adapted when the solenoid is energized to engage and move the valve-stem and valve, against the spring so as to close the valve, said spring, when the solenoid is de-energized, forcing the stem in the opposite direction to open the valve and to force the collar against the end of the plug to close the passage and slots extending therethrough.

13. A radiator inlet-valve for use in a steam heating system comprising a casing enclosing a steam chamber, a port for receiving steam and delivering it into the steam chamber, an outlet port for delivering steam from the chamber, a cage having a valve seat therein at the inner end of the outlet port, a movable assembly comprising a valve-stem slidable in the cage, a valve member at the inner end of the stem adapted to engage the valve-seat and close the outlet port, a collar member on the outer end portion of the stem, a spring confined between the cage and collar and adapted to move the valve away from the seat, a solenoid assembly closing the side of the steam chamber opposite the outlet port, the solenoid comprising a winding surrounding a central passage, a hollow plug closing the inner end portion of the passage, a closure for the outer end of the passage, a core movable in the passage, a rod projecting from the core through the plug in alignment with the valve-stem and adapted when the solenoid is energized to engage and move the valve-stem and valve against the spring so as to close the valve, said spring, when the solenoid is de-energized, forcing the stem in the opposite direction to open the valve and to force the collar against the end of the plug to close the passage therethrough and manually operated means engageable with said collar to move the valve to closed position.

PAUL B. PARKS.
WILLIAM R. PETERSON.

CERTIFICATE OF CORRECTION.

Patent No. 2,310,745.   February 9, 1943.

PAUL B. PARKS, ET AL.

It is hereby certified that error appears in the printed specification of the above numbered patent requiring correction as follows: Page 2, second column, lines 5 and 6, for "rods 51 and 53" read --rods 51 and 52--; page 5, second column, line 5, after "receiving" insert --steam--; and that the said Letters Patent should be read with this correction therein that the same may conform to the record of the case in the Patent Office.

Signed and sealed this 16th day of March, A. D. 1943.

(Seal)

Henry Van Arsdale,
Acting Commissioner of Patents.